US009838482B1

(12) United States Patent
Hardy et al.

(10) Patent No.: US 9,838,482 B1
(45) Date of Patent: Dec. 5, 2017

(54) MAINTAINING CLIENT/SERVER SESSION AFFINITY THROUGH LOAD BALANCERS

(71) Applicant: Amazon Technologies, Inc., Seattle, WA (US)

(72) Inventors: Steven Alexander Hardy, Delft (NL); Markus Petrus Giuseppe Sartor, The Hague (NL); Mark Swaanenburg, Rijswijk (NL); Isaac Alon Salpeter, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 14/576,016

(22) Filed: Dec. 18, 2014

(51) Int. Cl.
*G06F 15/16* (2006.01)
*H04L 29/08* (2006.01)
*H04L 29/06* (2006.01)

(52) U.S. Cl.
CPC ........ *H04L 67/141* (2013.01); *H04L 67/1023* (2013.01); *H04L 67/42* (2013.01)

(58) Field of Classification Search
CPC ............ H04L 67/1002; H04L 61/1511; H04L 67/1023; H04L 29/12066; H04L 47/125; H04L 45/7453; H04L 49/70; H04L 67/1027; H04L 67/1038
USPC ........ 709/203, 204, 217, 223–226, 228–229; 370/230, 235, 352, 392
See application file for complete search history.

(56) References Cited

U.S. PATENT DOCUMENTS

| | | | | |
|---|---|---|---|---|
| 6,078,960 A | * | 6/2000 | Ballard | H04L 67/1008 709/242 |
| 6,898,633 B1 | * | 5/2005 | Lyndersay | H04L 63/08 709/217 |
| 7,366,755 B1 | * | 4/2008 | Cuomo | H04L 12/66 370/230 |
| 8,438,594 B1 | * | 5/2013 | Kikinis | H04N 7/0255 345/419 |
| 9,591,084 B1 | * | 3/2017 | Egorov | H04L 67/146 |
| 2003/0009559 A1 | * | 1/2003 | Ikeda | H04L 29/06 709/225 |
| 2006/0064478 A1 | * | 3/2006 | Sirkin | H04L 29/12066 709/223 |
| 2009/0182605 A1 | * | 7/2009 | Lappas | G06Q 10/06 705/34 |
| 2010/0217793 A1 | * | 8/2010 | Preiss | H04L 67/1008 709/203 |
| 2011/0093584 A1 | * | 4/2011 | Qiu | H04L 29/12066 709/224 |

(Continued)

*Primary Examiner* — Dustin Nguyen
*Assistant Examiner* — Hao Nguyen
(74) *Attorney, Agent, or Firm* — Klarquist Sparkman, LLP

(57) ABSTRACT

In one embodiment, a system uses a two-layer deterministic function, such as a hashing mechanism, to ensure session stickiness or affinity. A client can generate a session key that can be used for at least two things. First, a load balancer can be selected by the client using the session key by using a consistent or deterministic hashing algorithm so that the same load balancer is selected from a set of weighted load balancers. After selecting the load balancer, the client can send the request to the selected load balancer. The load balancer then uses the same session key, which can be transmitted in an HTTP header, to select a backend host server computer. The result is that session affinity is maintained.

16 Claims, 9 Drawing Sheets

(56) References Cited

U.S. PATENT DOCUMENTS

| | | | | |
|---|---|---|---|---|
| 2011/0252127 | A1* | 10/2011 | Iyengar | G06F 9/5033 709/224 |
| 2014/0304409 | A1* | 10/2014 | Kamath | H04L 67/1036 709/225 |
| 2014/0337417 | A1* | 11/2014 | Park | H04L 67/1027 709/203 |
| 2014/0379938 | A1* | 12/2014 | Bosch | H04L 47/125 709/242 |
| 2015/0049764 | A1* | 2/2015 | Hieda | H04L 45/44 370/392 |
| 2015/0358472 | A1* | 12/2015 | Rosenberg | H04M 3/56 370/235 |

* cited by examiner

MAINTAINING CLIENT/SERVER SESSION AFFINITY THROUGH LOAD BALANCERS

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

In networking, a session is an interactive information interchange between two or more communicating devices (e.g., a server and a client). A session is typically stateful, meaning that at least one of the communicating parts needs to save information about the session history in order to be able to communicate, as opposed to stateless communication, where the communication includes independent requests with responses. Client-side sessions typically use cookies to maintain state without storing data on the server. When presenting a dynamic web page, the server sends the current state data to the client in the form of a cookie. The client saves the cookie and sends it back to the server with a new request. The server uses the data to remember the state of the application for that specific client and generate an appropriate response.

Where server-side state information is maintained, a session token or key can be used, which is a unique identifier that is generated to identify the current interaction session. The client usually stores and sends the token as an HTTP cookie and/or sends it as a parameter in GET or POST queries. The reason to use session keys is that the client only has to handle the identifier while session data is stored on the server.

In a cloud environment, some difficulties exist with the typical session communication. For example, sometimes sessions terminate and need to be reconnected. In such a case, for efficiency it is desirable that the client device reconnect with the same server. The client can be provided a server identifier in a cookie that allows the client to easily pass the cookie back with a request in order to be routed to the same server. However, a server identifier compromises security and allows hackers to identify and map server behavior. Additionally, cloud structures are designed to receive client requests and rout such requests to any of a plurality of servers, not a particular server. Without having a particular server identified, the networking session in a cloud environment can be inefficient, especially as any cached information associated with a particular session can be lost when a session disconnects and reconnects.

DETAILED DESCRIPTION

In one embodiment, the system uses a two-layer consistent hashing mechanism to ensure session stickiness or affinity. This mechanism allows session stickiness without the requirement that stateful load balancers store past session information (e.g., which server computer was previously connected in the session)(however, some state information regarding the network connection can be maintained). In one embodiment, the client generates a session key. The session key can be random, or specially crafted to optimize colocation of sessions on a certain set of servers. The session key can be used for at least two things. First, a load balancer can be selected by the client using the session key by using a consistent or deterministic hashing algorithm so that the same load balancer is selected from a set of weighted load balancers every time the same session key is used. The load balancers in some embodiments can be a virtual IP (VIP), which is a load balancing instance. Alternatively, the load balancers can be hardware or firmware based. In any case, the load balancers function to distribute work across multiple different host server computers and are positioned between the client device and the host server computers. The list of load balancers can be populated by a domain name system (DNS) server. After selecting the load balancer, the client can send the request, which arrives at the load balancer. The load balancer then uses the same session key, which was transmitted as an HTTP header, to select a backend host server computer. The result is that session affinity is maintained. Additionally, the system provides control of session colocation. In one example, sessions that access a certain emailbox can be directed to a single host server computer (or to a set of host server computers) without the need for any state on the load balancers (i.e., which host server computer was previously selected). In such a case, the host server computer is acting as an email server computer.

Figure 1:
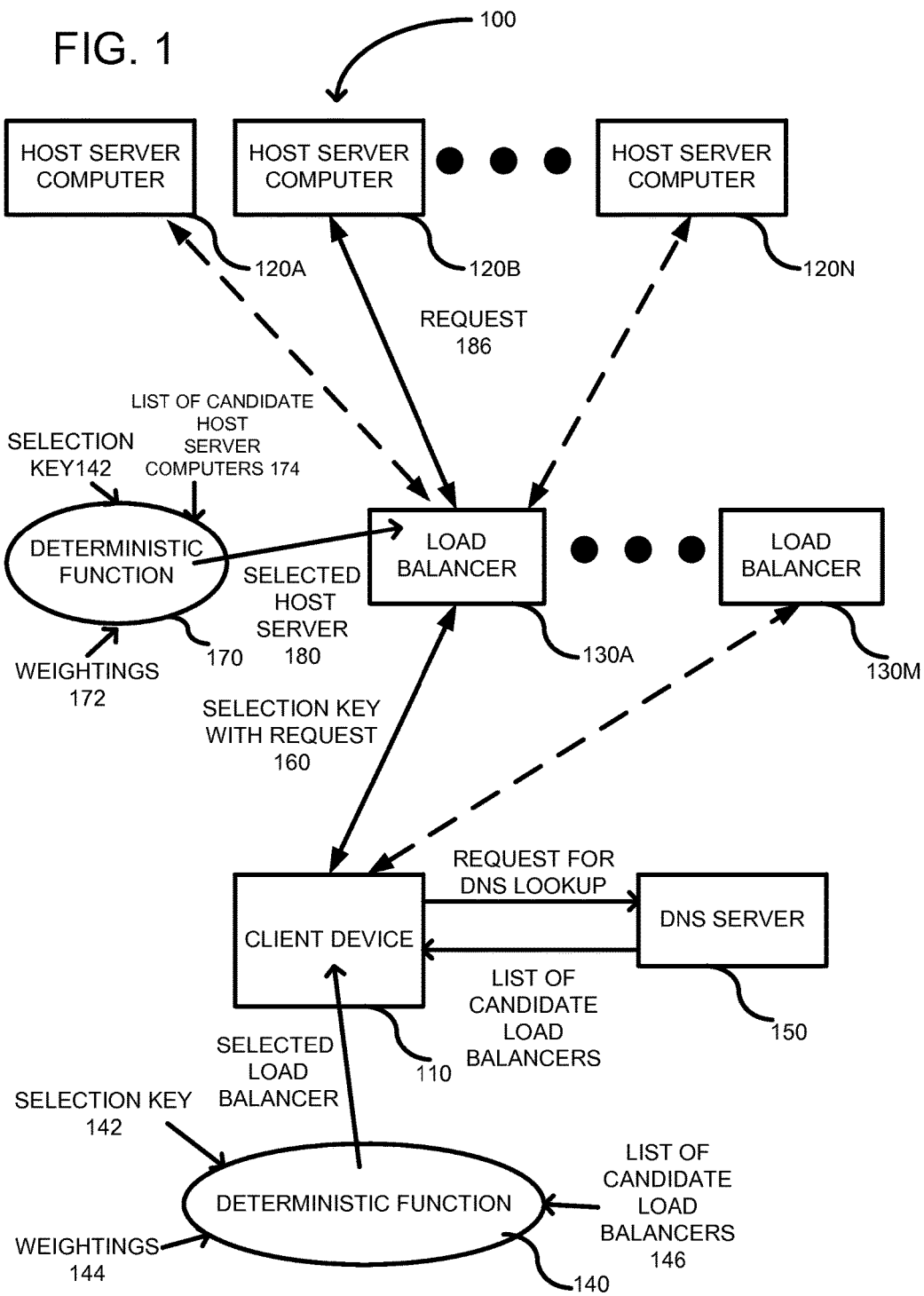
FIG. 1 is an example system diagram showing how a client device can maintain session affinity with a server computer through a layer of load balancers.

FIG. 1 shows an example embodiment 100 of a system using two-layers of deterministic functions to maintain session affinity between a client device 110 and one of a plurality of host server computers 120A-N (where N is any integer number) with a layer of load balancers 130A-M (where M is any integer number) positioned between the client device and the host server computers. Although the host server computers 120A-N are generally described as a single host server computer, the description herein extends to where each request is transmitted to a set of host server computers. By maintaining session affinity, once the client device 110 has interacted with a particular server 110, subsequent requests are directed by the load balancer to the same server. Such a feature is often referred to in web applications as "persistence". Rather than using a cookie-based approach, wherein information about the server identity can be derived by the client, or otherwise state information about a particular session needs to be stored at the load balancer, the example embodiment 100 can maintain session affinity by using one or more deterministic algorithms at the client and the intermediate load balancers. As a result, memory use at the load balancer is reduced and there is a reduced need for any cookie data transmitted between the load balancer and the client device (thus reducing network traffic and increasing the request speed between the client device 110 and the load balancer). Using session affinity, a host server computer 120 can maintain cache information from one or more previous sessions with the client device 110 in order to increase efficiency.

The client device 110 includes a first deterministic function 140 (a first layer) that can receive as one or more inputs the following: a selection key 142, weightings 144 and a list of load balancers 146. These one or more inputs can be used to select a particular load balancer 130 to which a request is transmitted. The request can initiate a new communication session with a host server computer 120 or can reestablish a previous communication session. The list of load balancers 146 can be obtained by submitting a request including a domain name to a Domain Name System (DNS) server 150. The list of load balancers 146 can be received from the DNS server and can include a plurality of IP addresses associated with candidate load balancers 130. Weightings 144 can be used so as to increase a likelihood of selecting one load balancer over another for performance reasons, capacity reasons, turn-around speed, etc. The weightings can be received from an administrator of the system 100 that has access into performance metrics associated with the system. The selection key 142 can be used as a further input into the deterministic function 140. In some embodiments, the selection key can be a simple session key. A session key is a term well understood in the art and generally refers to a symmetric key that is randomly (or pseudo-randomly) generated to ensure security of a communication session between two computers. In other embodiments, the selection key is different than the session key in that it can be generated using any input into a deterministic function (typically a different function than function 140) to create a unique identifier. As further described below, the selection key can be derived by various clients so that communication sessions can be grouped across clients. In particular, clients having access to the same inputs (e.g., a name associated with an electronic mailbox) and the same deterministic function can derive the same selection key 142. Thus, the selection key as described herein need not be randomly or pseudo-randomly generated, as may be the case with the session key.

Using the deterministic function 140 and one or more of the inputs 142, 144, 146, a selected one of the load balancers is identified from the list of candidate load balancers 140. In the simplest example, the deterministic function 140 can be a deterministic one-way algorithm, such as a hash function. With such a function, the selected load balancer is always the same provided the inputs to the function are the same. And the outputs cannot be used to derive the inputs. As shown at 160, the client device 110 can transmit a request to the selected load balancer, in this case shown as 130A (as indicated by the solid line instead of the dashed line associated with another candidate load balancer 130M). The selection key 142 (which can be the session key) can be included with the request, such as being inserted into the header. In some embodiments, the selection key and a separate session key can both be sent with the request 160, as described further below.

The selected load balancer 130A can also include a deterministic function 170 (a second layer), which takes as inputs the same selection key 142, possibly weightings 172, and a list of candidate host server computers 174. The weightings 172 can be different from weightings 144 and can also be provided by a system administrator so as to increase a percentage of requests to one or more of the host server computers 120. The deterministic function 170 can be the same or different from deterministic function 140. If different, it can also be a deterministic, one-way algorithm, such as a hash function, that always provides the same output for equivalent inputs. As a result of providing the inputs 142, 172 and 174 into the deterministic algorithm, an identifier of a selected host server computer is provided as an output 180. The load balancer 130A can forward the request 186 to the selected host server computer 120B, as indicated by the solid line as opposed to the dashed lines extending to other candidate host server computers. In some embodiments, where the selection key is different than a session key, just the session key can be transmitted to the host server computer together with the request. The host server computer 120B can then process the request and transmit a response either to the client device 110 directly or to the client device through the load balancer 130A.

Figure 2:
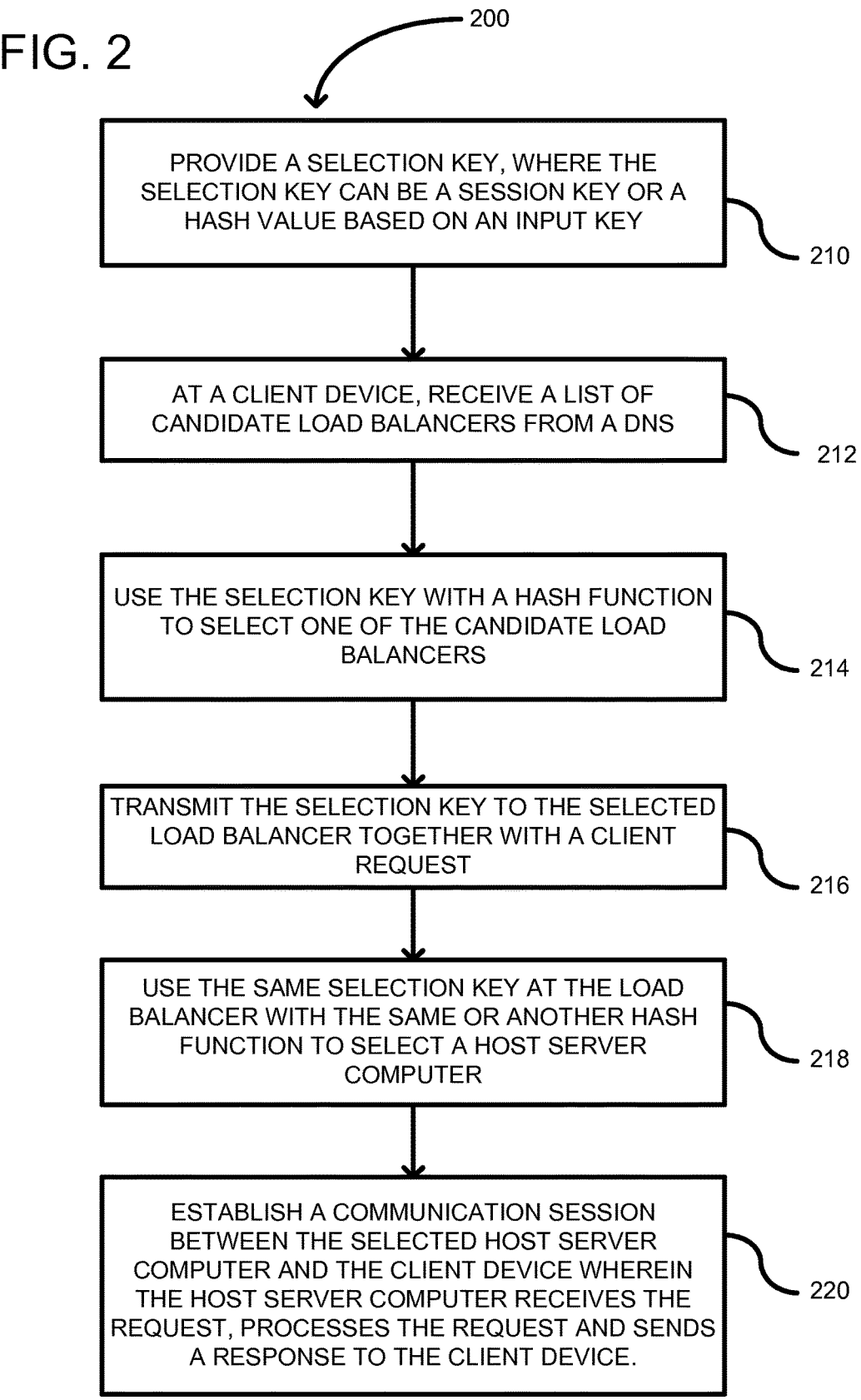
FIG. 2 is a flowchart of a method according to one embodiment wherein session affinity is maintained.

FIG. 2 is a flowchart 200 of a method according to one embodiment wherein session affinity is maintained. In process block 210, a selection key is provided to a client device. The selection key can be a session key or it can be a hash value based on an input key, for example. Other values derived from deterministic algorithms can also be used instead of a hash-based algorithm in generation of the selection key. Generation of the selection key can be derived using a simple input provided to multiple clients, such as an alphanumeric-based input. In the case where the selection key is a session key, it can be generated using a random number or pseudo-random number generator. In process block 212, a list of candidate load balancers can be received from a DNS server at the client device. The list can be a plurality of addresses (e.g., IP addresses) associated with candidate load balancers to which a request can be sent. In process block 214, the selection key can be used with a hash function to select one of the candidate load balancers. Notably, host server identification information is not needed to select one of the load balancers. In process block 216, the selection key can be transmitted to the selected load balancer together with the client request. In one example, the selection key can be included in the header of the request. In process block 218, the same selection key can be used at the load balancer with the same function as was used in process block 214 or another hash function in order to select a host server computer. Notably, state information relating to a previously selected host server computer need not be maintained at the selected load balancer. In process block 220, a communication session can be established between the selected host server computer and the client device wherein the host server computer receives the request, processes the request and transmits a response to the client device. The host server computer can transmit the response directly to the client device or through the load balancer, depending on the architecture.

Figure 3:
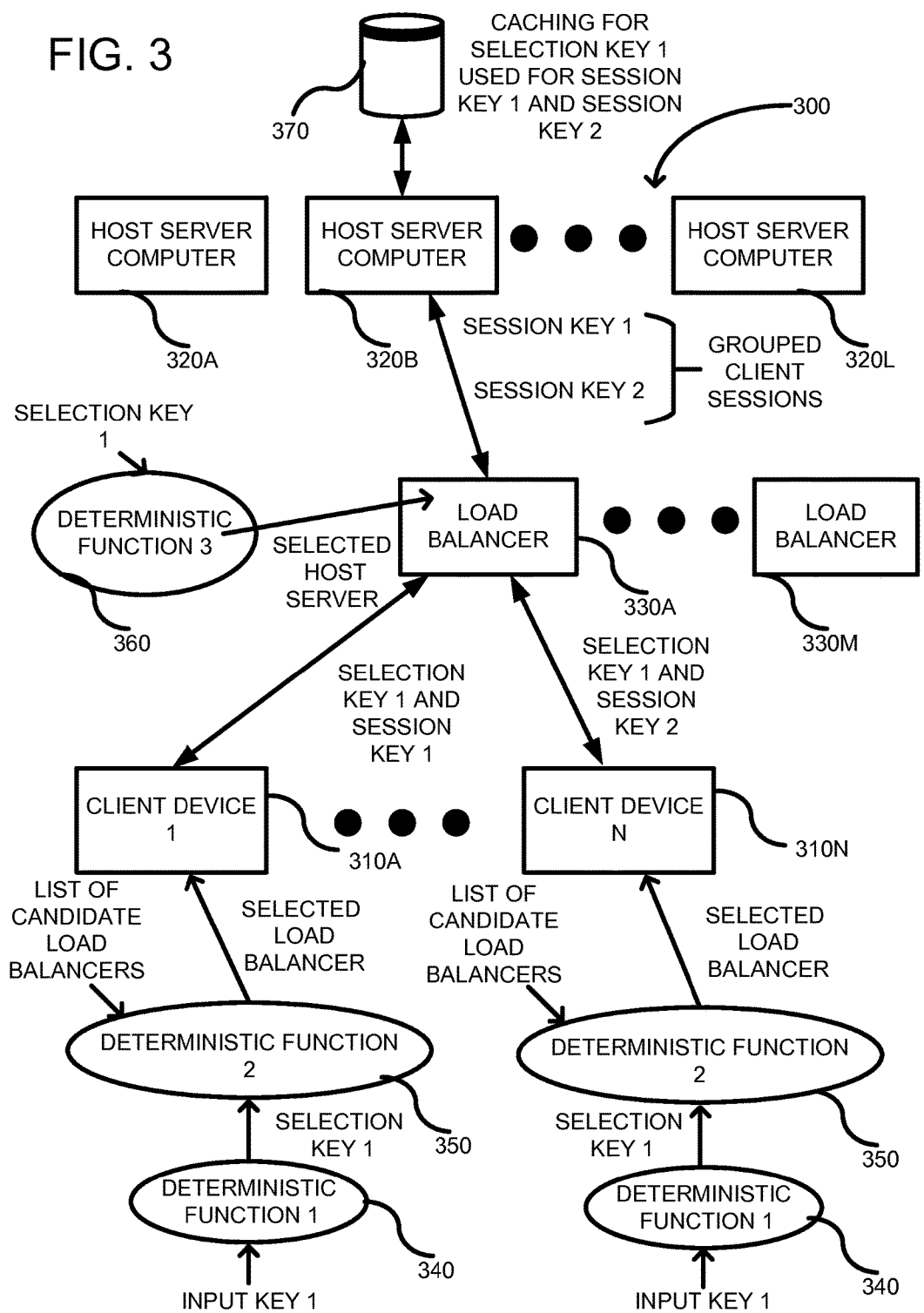
FIG. 3 is an example system diagram showing multiple requests from different client devices being directed to a same host server computer.

FIG. 3 shows an example embodiment 300 of a system using at least two-layers of deterministic functions to maintain session affinity between two or more client devices 310 (A-N where N is any integer number) and one of a plurality of host server computers 320 (A-L, where L is any integer number). A plurality of load balancers 330 (A-M, where M is any integer number) are positioned between the client devices 310 and the server computers 320. Several deterministic functions can be within the client devices 310. For example, a first deterministic function 340 can be available in each client device for which an affinity of communication sessions is desired. The first deterministic function 340 can receive an input key 1 that is the same across client devices. A simple example of an input key can be a name of a mailbox of a user or any other alphabetic, numeric, or alphanumeric inputs. The first deterministic function 340 can generate a selection key 1 that is input into a second deterministic function 2 shown at 350. In this case, the selection key is deterministic (i.e., not random) as multiple client devices can generate the identical selection key 1, assuming identical inputs to the deterministic function. Again, the deterministic functions 350 can be the same across client devices. Similar to the description of FIG. 1, the deterministic functions 350 can also receive a list of candidate load balancers from a DNS server. Weighting information (not shown) can also be used. Through the deterministic functions 340, 350, each client device 310 selects the same load balancer 330A, in the illustrated example. Although not shown, each client device 310 generates its own unique session key, which is typically a random number. For example, client device 310A generates session key 1 and client device 310N generates session key 2. Each client device 310 transmits to the load balancer 330A both the selection key 1 and its corresponding session key. The load balancer 330A uses the selection key in a third deterministic function 360 to select one of a plurality of host server computers 320. Once selected, the load balancer 330A can transmit the session keys 1 and 2 to the selected host server computer 320B together with the respective requests from each client device to establish two independent communication sessions that are directed to the same host server computer 320B. The host server computer 320B can have cached data 370 for selection key 1 used for session key 1 and session key 2. The directing of the sessions can be asynchronous in terms of timing (meaning that they are not simultaneous and can happen at any time) and the directing is merely related to which destination host server computer is used.

Figure 4:
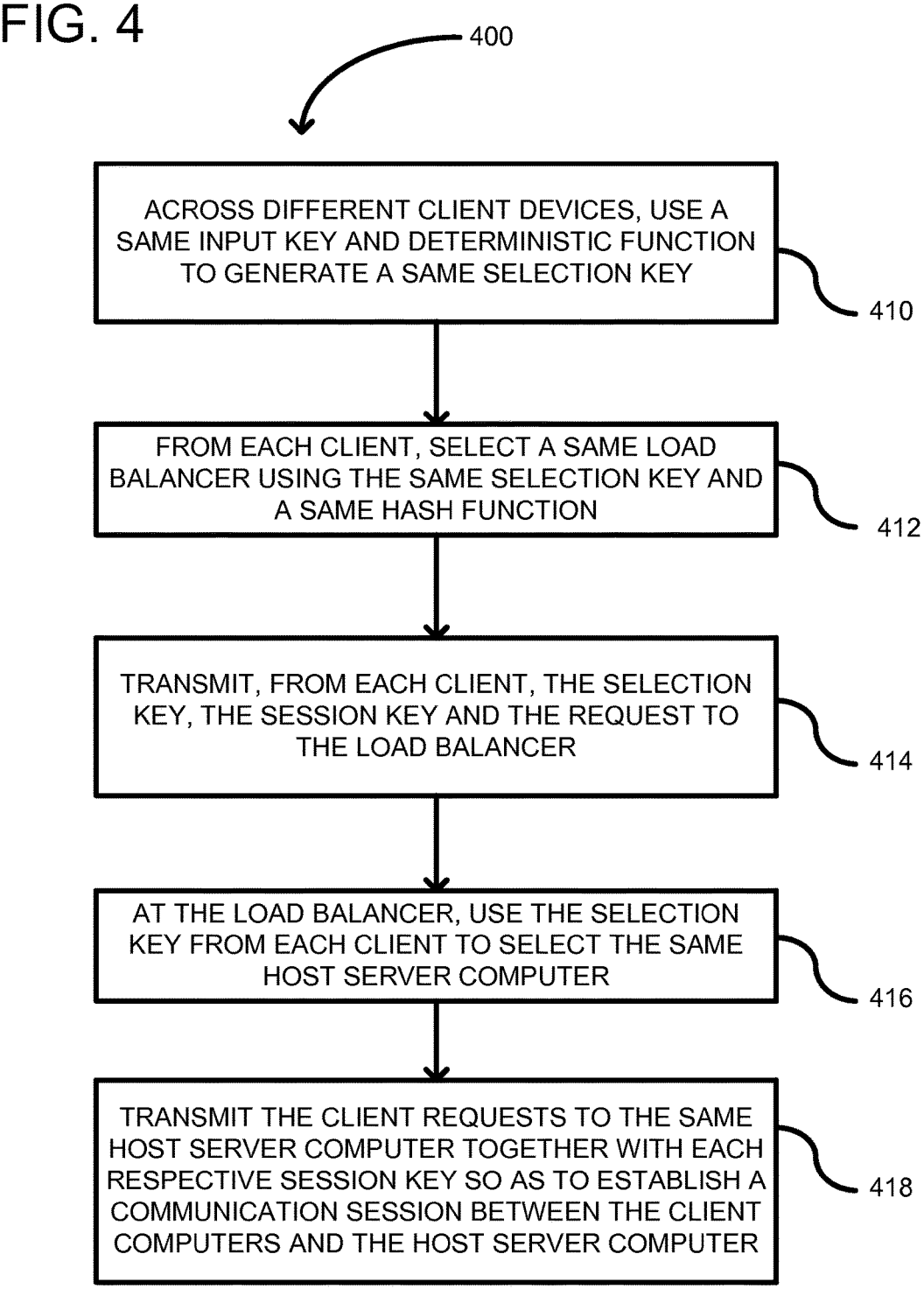
FIG. 4 is a flowchart of a method according to another embodiment to direct communication sessions across different client devices to a same host server computer.

FIG. 4 is a flowchart 400 of a method according to another embodiment to direct communication sessions across different client devices to a same host server computer. In process block 410, a same input key and same deterministic function are available to multiple client devices for generation of a selection key. In process block 412, from each client device, a same load balancer is selected using the same selection key and same hash function. In process block 414, each client device transmits the selection key, session key and the client request to the load balancer. The timing associated with such transmissions is asynchronous and can occur at any time. In process block 416, the selection key is used by the load balancer to select a same host server computer. In process block 418, the client requests are transmitted to the same host server computer together with each respective session key so as to establish a communication session between the client computers and the host server computer. As a result, communication sessions are directed to a same host server computer across different client devices.

Figure 5:
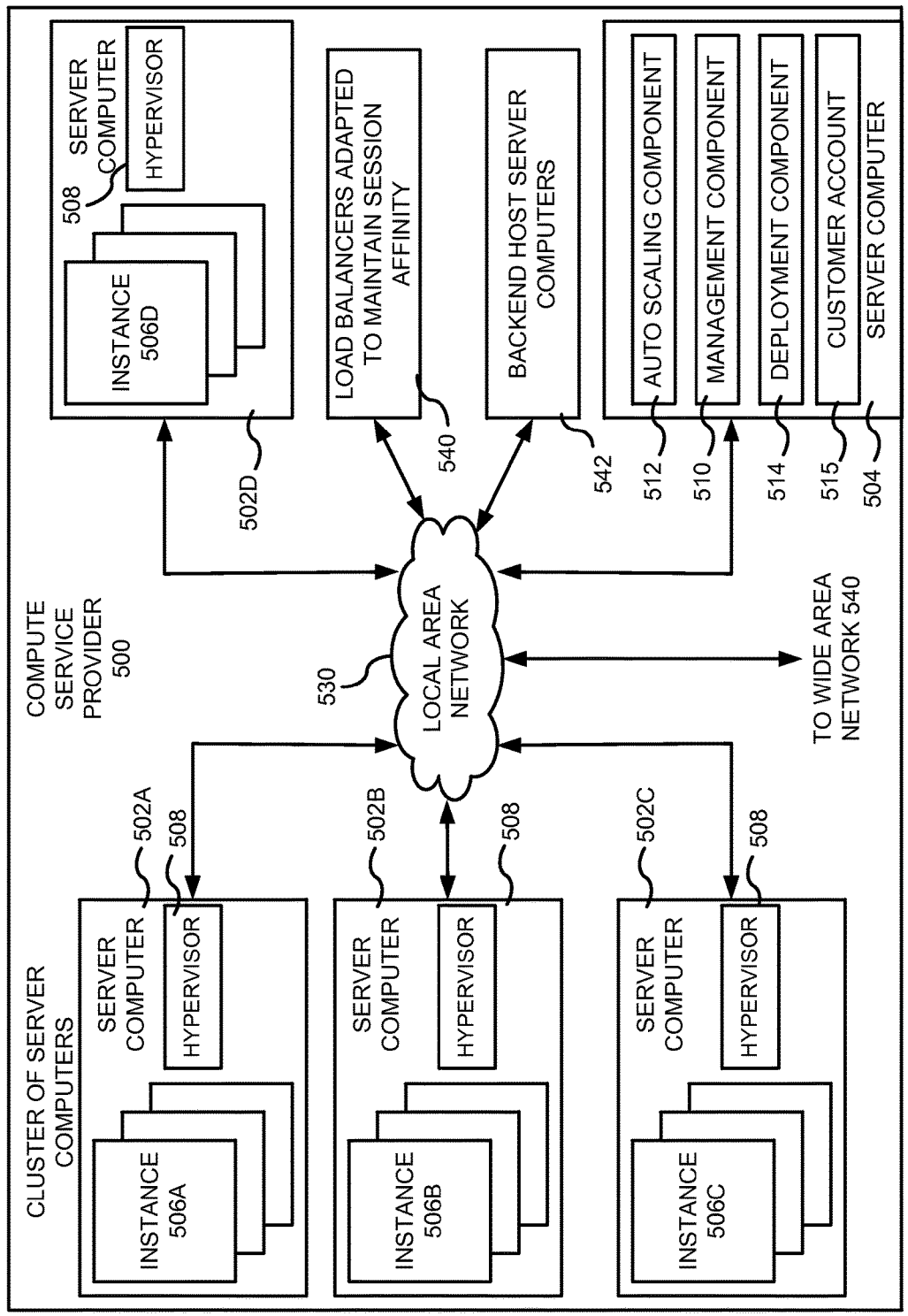
FIG. 5 is an example system diagram showing a plurality of virtual machine instances running in the multi-tenant environment with load balancers adapted to maintain session affinity between different client instances.

FIG. 5 is a computing system diagram of a network-based compute service provider 500 that illustrates one environment in which embodiments described herein can be used.

By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications. As described herein, an instance 506 can function as a client device. It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

A plurality of load balancers 540 can be coupled to the LAN 530 and can receive client requests from external client devices coupled to the WAN 540 or client devices running as instances 506. In either case, logic (as described herein) on the client devices can be used to select an appropriate load balancer from the plurality of load balancers 540. Furthermore, logic on the load balancers can then forward the request to a selected one or more of a plurality of host server computers 542 through the LAN 530.

Figure 6:
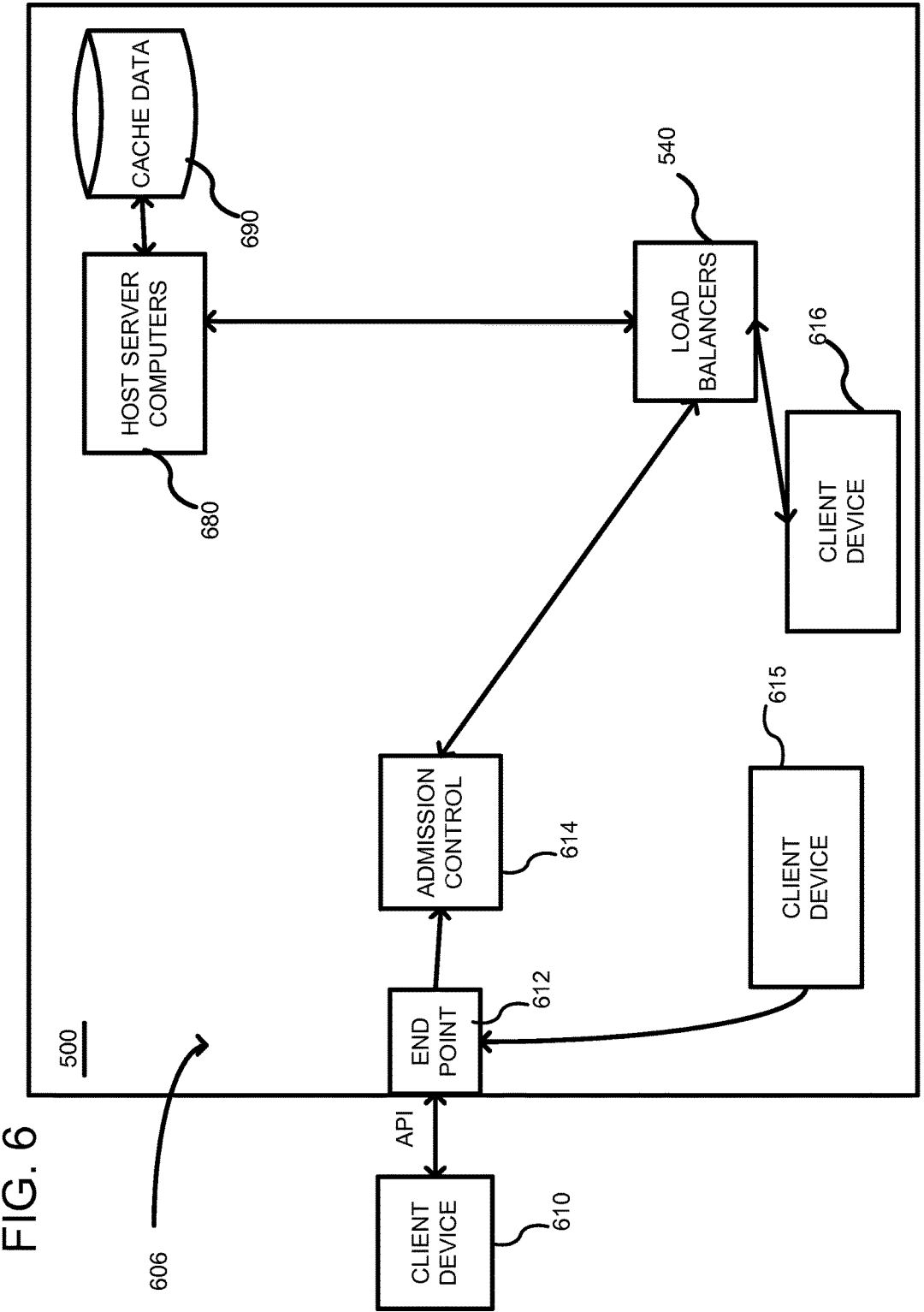
FIG. 6 shows further details of an example system including a plurality of management components associated with a control plane.

FIG. 6 illustrates in further detail management components 510 that can be used in the multi-tenant environment of the compute service provider 500. In order to access and utilize instances (such as instances 506 of FIG. 5), a client device can be used. The client device 610 can be any of a variety of computing devices, mobile or otherwise including a cell phone, smartphone, handheld computer, Personal Digital Assistant (PDA), desktop computer, etc. The client device 610 can communicate with the compute service provider 500 through an end point 612, which can be a DNS address designed to receive and process API requests. In particular, the end point 612 can be a web server configured to expose an API. Using the API requests, a client 610 can make requests to implement any of the functionality described herein. Other services 615, which can be internal to the compute service provider 500, can likewise make API requests to the end point 512 and act like client devices. Still other client devices 616 can bypass admission control and communicate directly with the load balancers 540.

Other general management services that may or may not be included in the compute service provider 500 include an admission control 614, e.g., one or more computers operating together as an admission control web service. The admission control 614 can authenticate, validate and unpack the API requests for service or storage of data within the compute service provider 500. Requests from client devices 610 and/or 615 can pass through admission control (which can be subsumed within other components, such as the load balancers 540) to be received at the load balancers 540. Using the technology described herein, the load balancers 540 can select an appropriate host server computer from a plurality of host server computers 680 and transmit the client request to the selected host server computer. The plurality of host server computers 680 can maintain associated cache data 690 used to increase efficiency across different communication sessions.

Figure 7:
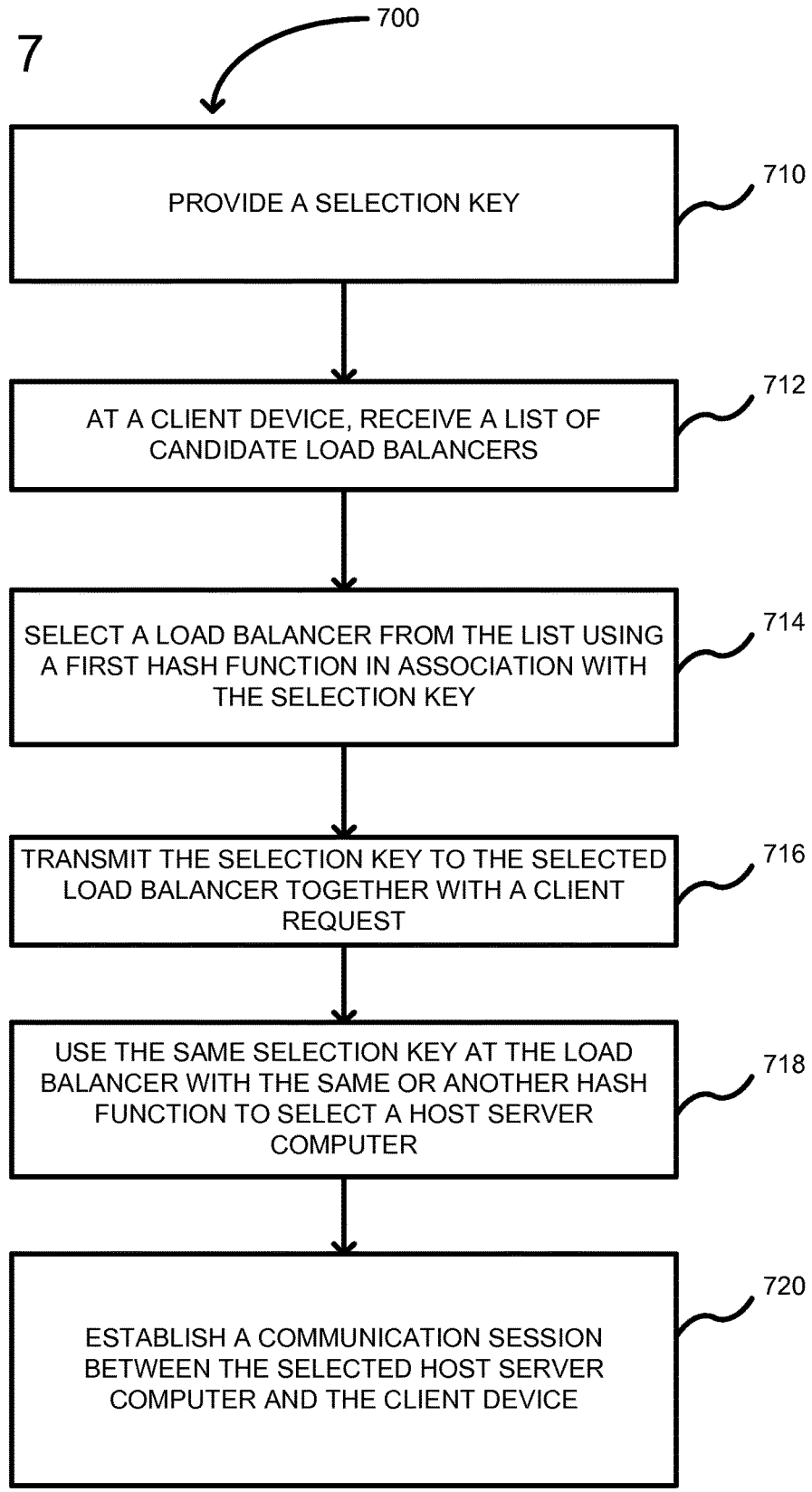
FIG. 7 shows a flowchart of a method for maintaining session affinity.

FIG. 7 shows a flowchart of a method 700 for maintaining session affinity between a client device and one of a plurality of host server computers. In process block 710, a selection key is provided. As previously described, the selection key can be a session key or a value generated from a deterministic algorithm. In either case, the client device typically generates the selection key, which is used to select a load balancer at one level (at the client device), and a host server computer at a second level (at the load balancer). In process block 712, at the client device, a list of candidate load balancers can be received. For example, the client device can request from a DNS server, a domain name lookup. In response, the client device can receive a list of candidate addresses associated with load balancers. In process block 714, a load balancer can be selected from the list using a first hash function in association with the selection key. In one example, the association is that the selection key is used as an input to the first hash function. In process block 716, the selection key can be transmitted to the selected load balancer together with the client request. In one example, the selection key can be transmitted in the header, but other techniques can be used, such as including the selection key as part of the data in the request or sending it in a separate request. In process block 718, the load balancer can use the same selection key with the same hash function as the first hash function or a second hash function to select a host server computer. Other inputs into the hash function can include a list of addresses associated with candidate host server computers and/or weighing information. In process block 720, a communication session can be established between the selected host server computer and the client device.

Figure 8:
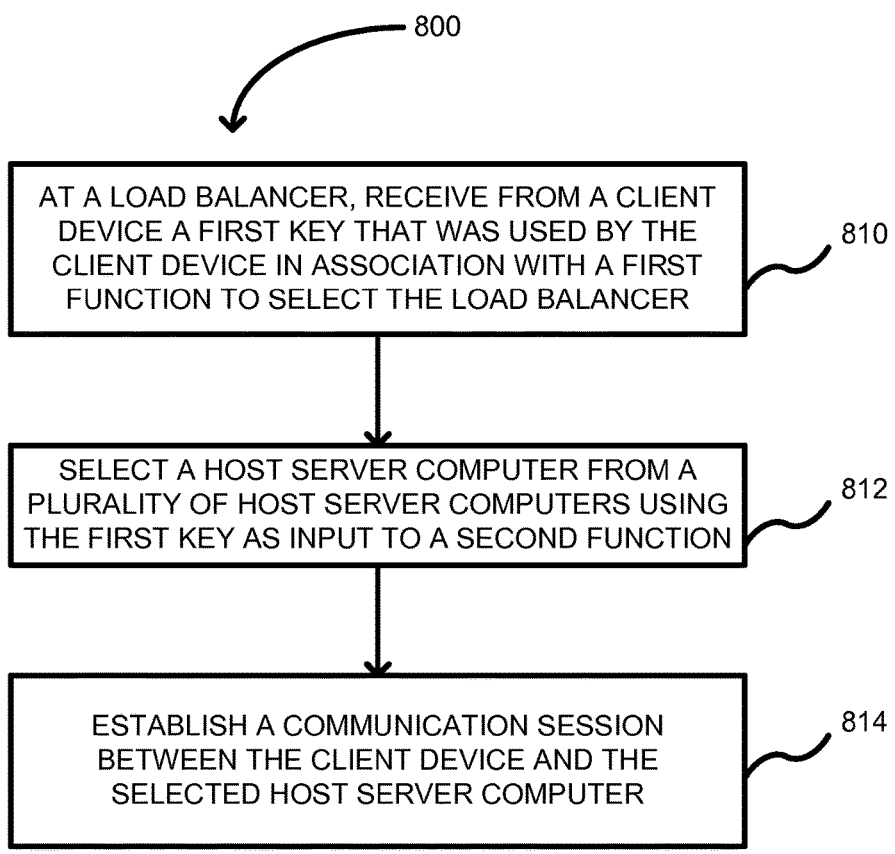
FIG. 8 shows a flowchart of a method according to another embodiment for maintaining session affinity.

FIG. 8 shows a flowchart 800 of a method according to another embodiment for maintaining session affinity. In process block 810, a first key is received at a load balancer that was used by the client device to select the load balancer in the first place. As is well understood in the art, load balancing is a core networking solution responsible for distributing incoming traffic among servers hosting the same application content. By balancing application requests across multiple servers, a load balancer prevents any application server from becoming a single point of failure, thus improving overall application availability and responsiveness. For example, when one application server becomes unavailable, the load balancer simply directs all new application requests to other available servers in the pool. To select the load balancer, the client device can use the first key in association with a first algorithm. The first algorithm can be any desired deterministic algorithm, such as a deterministic hash function. Other inputs can be used in association with the first algorithm, such as weighting information. The first key can be a session key or some other selection key that is itself a value generated by an algorithm based on a different key. For example, the selection key can be a hash value generated by a hash function that receives an input key to the client device (such as being received from a different client device). In addition to the first key, the load balancer can also receive an associated request from the client device that is to be forwarded and processed by a host server computer.

In process block 812, a host server computer can be selected by the load balancer from a plurality of host server computers. The load balancer can make such a selection by using the first key as input to a second function. In one example, a hash function can be used together with a list of candidate host server computers to select one of the host server computers. The second function can be deterministic so that the same host server computer is always selected when the first key is used as input to the second function. Other inputs, such as weighting information can also be used as input to the second function in order to factor into the ultimate host server computer selection.

In process block 814, a communication session can be established between the client device and the selected host server computer. A communication session is a semi-permanent interactive information interchange, also known as a dialogue, a conversation or a meeting, between two or more communicating devices. A session is set up or established at a certain point in time, and then torn down at some later point. An established communication session may involve more than one message in each direction. A session is typically, but not always, stateful, meaning that at least one of the communicating parts needs to save information about the session history in order to be able to communicate, as opposed to stateless communication, where the communication consists of independent requests with responses. In the present case, the selected host server computer can store state information in cache. By using two levels (client and load balancers) of deterministic algorithms that perform a selection process based on a key, state information does not need to be maintained at the client device or at the load balancer level. The communication session can be terminated and reestablished multiple times, and each time the same host server computer can be selected by using the same keys and the same algorithms (used to establish the communication session a first time) at both the client and load balancer levels. Using the two-level deterministic algorithm approach with consistent keys allows selection of a host server computer in a consistent way without identifying the selected host server computer to the client device.

Figure 9:
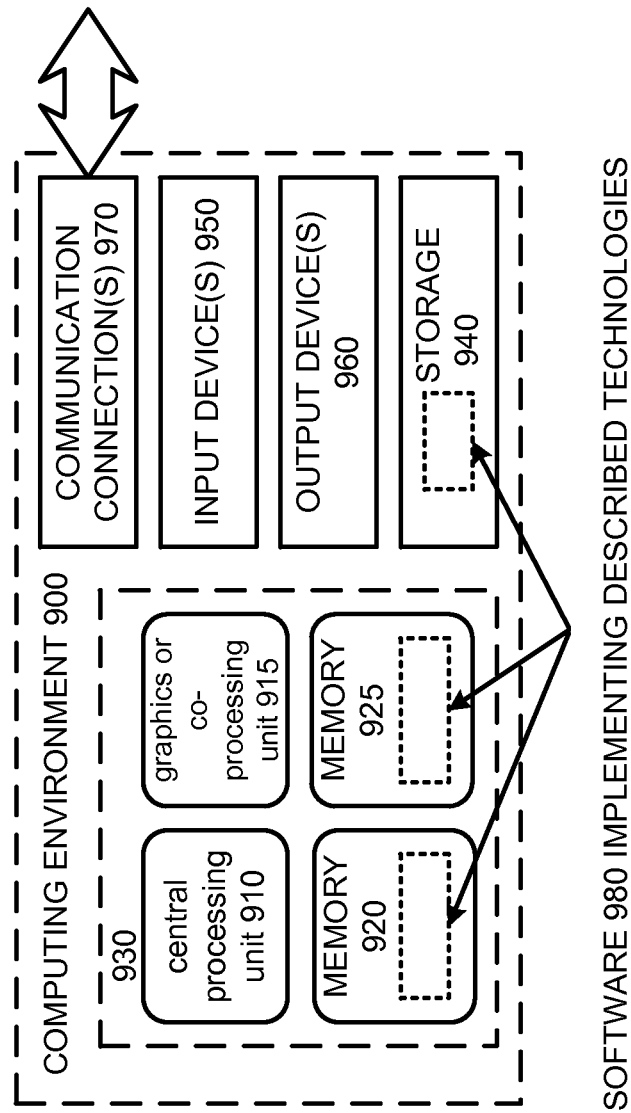
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of maintaining session affinity between a client device and one of a plurality of host server computers, the method comprising:
   providing, at the client device, a selection key;
   generating, at the client device, a session key, wherein the selection key is different than the session key;
   receiving a list of candidate load balancers;
   selecting, at the client device, a load balancer from the list of candidate load balancers using a first hash function in association with the selection key;
   transmitting the selection key and the session key to the selected load balancer for using the selection key in a second hash function to select one of the plurality of host server computers; and
   establishing a communication session between the client device and the selected host server computer using the session key.

2. The method of claim 1, wherein the client device is a first client device and further including directing communication sessions to the selected host server computer across different client devices by providing the selection key and the first hash function to at least a second client device, different than the first client device.

3. The method of claim 1, further including weighting the candidate load balancers, wherein the weighting is used in selecting the load balancer.

4. The method of claim 1, wherein an identification of the selected host server computer is not provided to the client device.

5. The method of claim 1, wherein state information regarding the selected host server computer is not maintained at the selected load balancer.

6. The method of claim 1, wherein the selected host server computer is an email server computer and the communication session is established so that a user of the client device can access an emailbox.

7. A computer-readable storage medium including instructions that upon execution cause a computer system to:
   receive, from a client device, a first key that was used by the client device in association with a first hash function executed on the client device to select a load balancer from a plurality of load balancers and a session key that was generated at the client device, wherein the first key is different than the session key,
   select, at the selected load balancer, a host server computer from a plurality of host server computers using the first key as an input to a second hash function; and
   establish a communication session between the client device and the selected host server computer using the session key.

8. The computer-readable storage medium of claim 7, wherein the first and second hash functions are deterministic hash functions.

9. The computer-readable storage medium according to claim 7, wherein the client device is a first client device and wherein the instructions, upon execution further cause the computer system to:

provide the first key and the first hash function to a second client device so as to direct communication sessions across client devices to the selected host server computer.

10. The computer-readable storage medium according to claim 7, wherein the instructions, upon execution, further cause the computer system to:

after termination of the communication session, reestablishing the communication session with the same selected host server computer by using the first and second hash functions and the first key.

11. The computer-readable storage medium according to claim 7, wherein the instructions, upon execution, further cause the computer system to:

receive the list of load balancers from a Domain Name System Server and use the list as input to the first hash function.

12. The computer-readable storage medium according to claim 7, wherein an identification of the selected host server computer is not provided to the client device.

13. The computer-readable storage medium according to claim 7, wherein the instructions, upon execution, further cause the computer system to:

weight the plurality of load balancers, wherein the weighting is used in selecting the load balancer.

14. A system for maintaining session affinity in a multi-tenant environment, comprising:

a first plurality of host server computers, each including a processor and a memory, coupled together through a network to form the multi-tenant environment, the first plurality of host server computers having instances executing thereon, wherein at least one of the instances is configurable as a client device or is coupled to a client device;

a plurality of load balancers coupled to the first plurality of host server computers within the multi-tenant environment for receiving a request from the client device to initiate a communication session with a backend service in the multi-tenant environment, wherein the client device is configured to:

select one of the plurality of load balancers to initiate a communication session by using a selection key as input to a first hash function executed on the client device;

generate a session key, wherein the selection key is different than the session key;

transmit the selection key and the session key to the selected load balancer; and a second plurality of host server computers, each including a processor and a memory, coupled to the plurality of load balancers, the second plurality of host server computers providing the backend service in the multi-tenant environment, wherein the selected load balancer is configured to:

select one of the second plurality of host server computers using the same selection key that was used by the client device to select the load balancer and using a second hash function;

transmit the session key to the selected server computer in a request for using the session key to establish a communication session between the client device and the selected host server computer.

15. The system of claim 14, wherein the first and second hash functions are deterministic hash functions.

16. The system of claim 14, wherein the client device receives a list of the plurality of load balancers through a domain name system server request.

* * * * *